April 12, 1955
L. F. THIRY
2,706,126
VIBRATION MOUNTINGS
Filed July 8, 1949
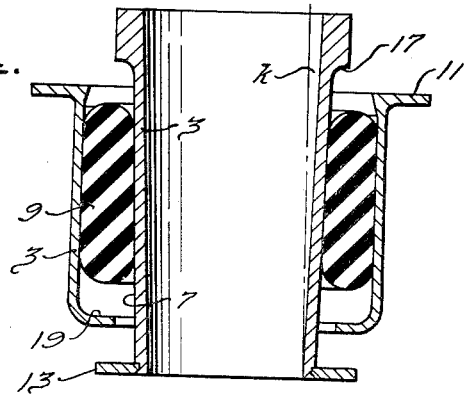
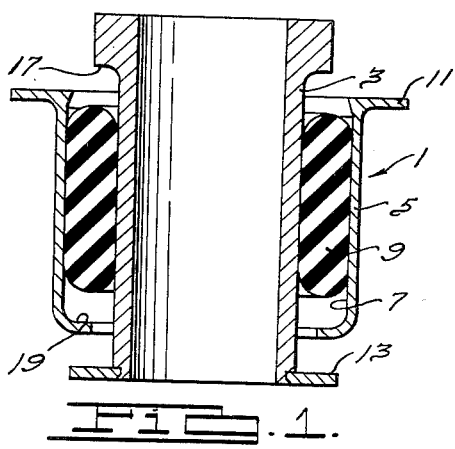
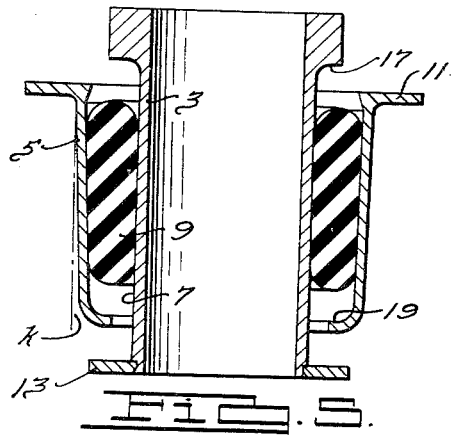
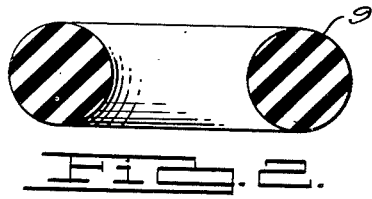
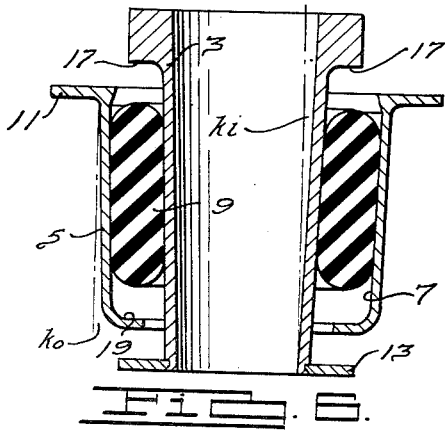
INVENTOR.
Leon F. Thiry.
BY
Harness, Dickey & Pierce.
ATTORNEYS

United States Patent Office 2,706,126
Patented Apr. 12, 1955

2,706,126

VIBRATION MOUNTINGS

Leon F. Thiry, Montclair, N. J.

Application July 8, 1949, Serial No. 103,734

3 Claims. (Cl. 287—85)

This invention relates to flexible rolling joints such as exemplified by vibration mountings or rubber springs and the like in which a layer of rubber is interposed between a pair of relatively movable members and serves to yieldably resist and dampen vibratory movement of the members. Joints of this type are usually employed to resist both angular and axial movement.

Vibration mountings embodying the so-called "rolling" type of rubber layer or insert are widely used in applications wherein the amplitudes of axial vibration are rather large. These mountings generally consist of inner and outer annular members, one or both of which are often conical, with a rubber layer in between. In the free state, prior to assembly between the members, the rubber insert is a torus, but after insertion it is flattened to become a layer between the members. Due to its natural tendency to resume a circular cross section, a flattened, properly dimensioned insert of this form does not slide relative to the inner and outer members because of the high-pressure contact, but, when the members are moved relatively to each other in an axial direction, the insert, though in a flattened condition, rolls between the members. This behavior is taken advantage of in the assembly of mountings of this type, so that in the past the rubber insert has always been rolled into place between the members; e. g., see United States Patent No. 2,179,959 of R. Schroedter.

In cylindrical mounts, resistance of the insert to being turned inside out is the essential source of resistance provided by the rolling insert to relative axial movement of the members. Where increased resistance to movement in one direction is desired it may be obtained by tapering one of the members so as to result in further flattening and a tendency to extrude the rubber layer. Heretofore, the latter type of mount has been inherently unstable and it has been necessary in the past to provide proper restraints to relative movement upon the release of the load on the member since the tendency of the flattened insert to return to its circular form is likely to be sufficiently powerful to eject one of the members from the mount.

The present invention provides a mount of the rolling type which in either cylindrical or tapered (conical) form has, as compared with prior mounts of this type, an increased resistance to deflection. Thus, the present mount has a greater load-carrying capacity but is still able to absorb large deflections. Furthermore, the invention provides a conical or tapered mount which is stable; i. e., there is no danger of one of the members being ejected from the mount. Though these results are consistently obtained by the practice of the invention, the underlying mechanism which accounts for them is not fully understood at the present time so that no theory can be advanced which will furnish a satisfactory explanation of the results.

In the improved rolling-type vibration mount of the present invention the insert is assembled between the members by the well-known "shooting" process, such as used in making bushings, described in United States Patent No. 1,739,270 of the present inventor. In this process the insert is flattened by direct radial compression without any rotation of the radial sections about the axis of the generally circular generatrix. In assembly by rolling there is such rotation about the axis of each radial section of the insert so that the resulting stress pattern is extremely complex. It seems certain that it is the difference in the internal stress condition of the rubber insert obtained by the shooting process as compared with the rolling method of assembly which is responsible for the improved results of the present invention. However, it will be readily apparent that there are respectable obstacles in the path of either an analytical or experimental study of the stress patterns in the inserts of these mounts which make it undesirable to theorize as to their nature and the mechanisms responsible for the difference in results obtained by the use of mounts assembled by these two methods.

The present mountings, even when slightly conical, are not necessarily unstable as were prior rolling-type mountings. It has been discovered that instability (i. e., tendency to eject the movable member of the mount) exists only when the angle of taper of the conical surface with respect to its axis is above a certain maximum angle, referred to herein as the angle of repose. Thus, the invention provides a double-acting conical mount by limiting the angle of taper to no more than the angle of repose.

Illustrative embodiments of the invention are shown in the accompanying drawing in which:

Fig. 1 is an axial section through one of the improved mounts;

Figs. 2 and 3 are detail views of two forms of rubber insert, as they exist in the free state, for use in the present mounts;

Figs. 4–6 show, in section, various tapered mounts.

The improved mount 1 of Fig. 1 comprises an inner cylindrical sleeve 3 and an outer cylindrical sleeve 5. These sleeves are coaxial so that they provide therebetween an annular chamber 7 for the annular rubber insert 9. The outer sleeve 5 may be provided with a radial flange 11 whereby it may be fixed to a stationary object while the inner movable sleeve 3 may be provided with a radial flange 13 that is capable of abutment with the lower end of the sleeve 5 to limit the stroke. Obviously, the mount may be arranged so that both members or either member is movable and it may also be modified in any desired manner to suit it for attachment to the apparatus in which it is to be employed, these being but matters of ordinary design.

In its free state the insert 9 is of rolling form; i. e., it has a substantially circular cross section. The inner diameter of the insert 9 in its free state is somewhat smaller than the outer diameter of the sleeve 3, while the outer diameter of the insert 9 in its free state is somewhat larger than the inner diameter of the outer sleeve 5. Thus, after insertion in the chamber 7, the rubber ring 9 is flattened or radially compressed and therefore elongated in the direction of the axis of the mount.

Suitable forms of rolling inserts 9 are shown in Figs. 2 and 3. Each of these is a simple torus but the ring of Fig. 3 has an annular flat 15 on its outer periphery which facilitates its insertion in the chamber 7 without any rolling during insertion. The flat 15 may be replaced by a peripheral surface having a finite radius of curvature which is larger than that of the balance of the periphery of the insert, the criterion being that the flat or the equivalent thereof be capable of preventing rolling during assembly but not interfering with rolling action during use of the joint. It will be evident that other forms of insert 9, such as ellipses, may be used, the requirement being merely that it be capable of rolling on the members 3 and 5.

As previously mentioned, inserts of this type have heretofore been assembled in the mount by rolling. Rolling of the ring 9 involves, of course, its turning inside out so that there is considerable angular deformation of the radial cross sections about their circular axis. It will be recognized that the ring of Fig. 3 because of the flat 15 is not the conventional type of insert used in a rolling joint that is assembled by rolling, but that it is still capable of providing rolling action.

In the present invention the rings 9 are inserted without the angular deformation incident to rolling. This is done by means of the well-known shooting process of assembly described in the present inventor's Patent No. 1,739,270. This is accomplished briefly by first pushing the insert into the outer sleeve, this being done in the presence of a suitable lubricant such as water, petroleum jelly or rosin oil which will absorb or dry out after assembly has been completed.

It will be seen that the flat 15 will facilitate this first step since it fits the insert to the wall of the outer sleeve 5 and prevents rolling during assembly. The insert is now in a condition of radial compression but has no substantial axial elongation. This is imparted to the insert by the second step, also conducted in the presence of a lubricant, which consists in forcing a tapered punch, to which is attached the inner sleeve 3, through the inner opening of the insert, generally preferably at a high rate of speed. This results in additional radial compression of the insert 9 and also in axial elongation since the chamber 7 is of lesser radial width than the free width of the insert. It will be noted, however, that this mode of assembly does not roll or twist the ring 9 so that its stress condition after assembly is different than that present in an insert assembled by rolling. After the lubricant has dried, the mount is ready for use. Clearly the mode of assembly could be reversed in which case the flattened surface 15 would be on the inner periphery.

The manner in which mounts of this type function is well known and need not be discussed in detail. The present mount differs from those heretofore known in that its resistance to axial movement of the inner member 3 is increased, probably because this axial movement creates a shear resistance which is lacking or highly reduced in the rolling joints of the prior art, though the permissible stroke of the mount is not affected. If desired, radially inturned bumpers 17 and 19 may be provided on the inner and outer members 3 and 5 respectively to engage the ends of the insert 9 and thus regulate or limit the stroke of the mount. The bumpers may be spaced from the insert as desired except that the spacing should permit less than 90° roll of the insert in either direction.

Figs. 4–6 show that the "shot" rolling insert 9 of this invention may be used when either or both the inner and outer sleeves 3 and 5 are tapered or conical in form. Conicity of the sleeves is employed to counteract the inherently low resistance of the mount to axial movement. For example, when the axis of the mount is vertical and a mere gravity load is placed thereon it may, in the absence of taper, cause the mount to bottom or deflect to its lowermost position. Conicity, however, increases the resistance in the one direction because the radial width of the chamber 7 decreases with the deflection to compress and extrude the insert. In the past, however, the angle of taper $k$ (i. e., angle that the conical surface makes with the axis of the mount) has always been so great that with exterior loads removed the vertical component of elastic forces exerted by the flattened rubber ring 9 ejected the movable member unless proper restraints were provided. These forces simply caused the sleeves to roll apart. In accordance with the present invention straight or constant sloped surfaces are used and the angle $k$ is less than the value which will cause ejection of the movable member at no load. The angle having this value is designated the angle of repose; and if the taper angle is less than the angle of repose, the mount is stable and capable of supporting axial loads in either direction. This angle is generally less than about six degrees, though it will be appreciated that it is affected by variations in the size and shape of the mount, the nature of the rubber insert 9, the magnitude of the possible loads which must be sustained in the direction in which the conical angle tends to roll the members apart, and the nature of the lubricant. In the case of double tapers in the same direction as in Fig. 6, the sum of the taper angles $(k_i+k_o)$ will have to be considered in determining the angle of repose. Though obviously based on a different fundamental principle, the phenomenon of the repose angle is clear-cut and is generally similar in effect to the phenomenon of the Morse taper or similar conical surfaces used in machine tool practice for fixing the shanks of drills, reamers, etc. in the spindles.

It should be noted that in any rolling joint the resistance to relative axial movement due to the resistance of the insert to turning inside out is a function of the ratio of the outside diameter of the insert in its free state to the inside diameter in its free state, and as this ratio varies, the angle of repose also varies. However, rolling joints assembled by shooting as distinguished from rolling exhibit a surprising increase in axial load capacity, all other factors being equal, and this permits the use of such mounts to sustain reciprocating loads even when the inner and outer members have a small conical angle calculated to increase the load capacity in one direction as compared with the other.

What is claimed is:

1. In a flexible joint, the combination of an inner member having an outer annular surface, an outer member having an inner annular surface, said outer member concentrically surrounding said inner member and spaced therefrom whereby said surfaces define an annular chamber, one of said surfaces being conical with a constant slope with respect to the axis of the members said slope being less than the angle of repose, and an annular rubber insert having in the free state a radial cross section of rolling form in said chamber in a state of radial compression and axial elongation with respect to the axis of the chamber, said insert having been assembled between the members by means of axial sliding and direct radial compression without angular or rolling deformation of the radial cross sections thereof.

2. In a flexible joint, the combination of an inner member having an outer annular surface, an outer member having an inner annular surface, said outer member concentrically surrounding said inner member and spaced therefrom whereby said surfaces define an annular chamber, one of said surfaces being conical with a constant slope with respect to the axis of the members said slope being less than the angle of repose, and an annular rubber insert having in the free state a radial cross section of rolling form in said chamber in a state of radial compression and axial elongation with respect to the axis of the chamber, said insert having been assembled between the members by means of axial sliding and direct radial compression without angular or rolling deformation of the radial cross sections thereof, said insert having a flat formed on a periphery thereof to engage one of said surfaces and inhibit rolling of the insert during assembly and after assembly forming an intermediate portion of the axial length of the flattened insert which engages said surface.

3. In a flexible joint, the combination of an inner member having an outer annular surface, an outer member having an inner annular surface, said outer member concentrically surrounding said inner member and spaced therefrom whereby said surfaces define an annular chamber, and an annular rubber insert having a radial cross section of rolling form in its free state and having a substantially flat surface on a periphery thereof, said flat surface engaging one of said first named surfaces to prevent rolling of the insert during assembly of the members therewith, said insert being in assembly in a state of radial compression and axial elongation and said flat surface forming an intermediate portion of the flattened side of the insert that engages one of said first named surfaces.

References Cited in the file of this patent

UNITED STATES PATENTS

| Number | Name | Date |
| --- | --- | --- |
| 1,739,270 | Thiry | Dec. 10, 1929 |
| 1,803,491 | Thiry | May 5, 1931 |
| 1,856,646 | Lee | May 3, 1932 |
| 1,913,198 | Geyer | June 6, 1933 |
| 2,179,959 | Schroedter | Nov. 14, 1939 |
| 2,329,000 | Rembert | Sept. 7, 1943 |
| 2,428,932 | Fawick | Oct. 14, 1947 |
| 2,446,621 | Thiry | Aug. 10, 1948 |
| 2,457,647 | Dodge | Dec. 28, 1948 |